2,810,742
Patented Oct. 22, 1957

2,810,742

METHOD FOR THE PREPARATION OF METHYL β-CYANOISOBUTYRATE

Newman M. Bortnick, Oreland, and Gerard E. Gantert, Philadelphia, Pa., assignors to Rohm & Haas Company, Philadelphia, Pa., a corporation of Delaware No Drawing. Application May 15, 1956,
Serial No. 584,900

10 Claims. (Cl. 260—465.4)

This invention deals with a method for the preparation of methyl β-cyanoisobutyrate.

The present method concerns the bringing together and causing to react hydrocyanic acid and methyl methacrylate at elevated temperatures, employing superatmospheric pressure and a cyanide ion generating catalyst.

Temperatures in the range of 130° to 275° C. must be used, when the present method is conducted batchwise, with a range of 140° to 180° C. preferred. Temperatures appreciably below 130° C. lead to insignificant results and temperatures appreciably above 275° C. lead to excessive decomposition. Hence, the above stated temperatures must be rigorously adhered to. If the present method is conducted on a continuous basis, the above statements with regard to temperature still apply, except that the reaction may be conducted at temperatures somewhat above 275° C., but preferably not above 300° C., particularly if contact times are limited to 10 to 20 minutes. On a continuous basis, the preferred temperature range is from 175° to 225° C. In either the batch or continuous procedure, there is an appreciable exothermic heat of reaction which aids in maintaining the reaction temperature in the stated range and in some cases some cooling may be required.

The present method must be conducted at superatmospheric pressures. The use of atmospheric pressure is ineffectual in the present method. Pressures in the range of about 50 to 2000 p. s. i. g. and above are satisfactorily employed with a range of 50 to 275 p. s. i. g. preferred. Pressures appreciably below 50 p. s. i. g. do not effect the present reaction. The pressures stated are advantageously achieved by the use of nitrogen with varying degrees of an autogenous pressure contribution from the reaction system. The process is quite satisfactorily conducted under autogenous pressure alone.

There is required a cyanide ion generating catalyst, preferably in amounts of about 0.1 to 20% by weight of the total weight of the reactants. Suitable in this respect are alkali metals and their carbonates, alkali and alkaline earth metal lower alkoxides, oxides, hydroxides, peroxides, and cyanides, tertiary amines, and quaternary ammonium bases. Actually there may be employed as catalyst any base whose aqueous 0.1 molar solution has a pH of about at least 9. Typical examples of the catalyst that may be used are sodium, potassium, lithium, sodium methoxide, potassium butoxide, lithium ethoxide, magnesium ethoxide, sodium oxide, potassium hydroxide, calcium oxide, barium hydroxide, strontium hydroxide, sodium peroxide, magnesium peroxide, potassium cyanide, lithium cyanide, barium cyanide, magnesium cyanide, sodium carbonate, potassium carbonate, trimethylamine, triethylamine, triethanolamine, octyldimethylamine, N-methylmorpholine, benzyltrimethylammonium hydroxide, dibenzyldimethylammonium hydroxide, dodecenyltriethylammonium hydroxide, and the like. The alkali metal cyanides are particularly effective for the instant purposes.

It is preferred to conduct the present reaction on a batch basis and in such a procedure it is advantageous to dissolve the methyl methacrylate in the hydrocyanic acid and add them to a reaction vessel charged with a solution, suspension, or slurry, as the case may be, of catalyst and methyl methacrylate. In subsequent reactions, the vessel may be charged with catalyst and methyl β-cyanoisobutyrate, the adduct formed by the present method, if desired. It is satisfactory to start with methyl methacrylate and catalyst in the reaction vessel and then introduce gaseous or liquid hydrocyanic acid, as desired. Also, the catalyst may be added all at once or intermittently as desired, or the hydrocyanic acid or hydrocyanic acid solution of methyl methacrylate may be added all at once or at a rate sufficient to maintain a relative constancy of reaction conditions, as desired. Also, both catalyst and reactants may be added all at once or intermittently, as desired. The advantages of the above refinements will be apparent to one skilled in the art from the teachings of the present invention.

It is preferred to introduce hydrocyanic acid, alone or in a solution with methyl methacrylate, to a mixture of methyl methacrylate and catalyst at a gradual rate so that reaction occurs promptly after the two reactants and the catalyst meet under the defined conditions, with the methyl methacrylate in excess. Under such arrangements there is substantially no polymerization of hydrocyanic acid and yields of the desired product are very high.

In the present invention, hydrocyanic acid may be introduced into the reaction environment in either the gaseous or liquid state.

Since, in some cases, it may be that the catalyst is not soluble or at least not entirely soluble in the reaction system, it is desirable to agitate the reaction system, such as by stirring or rocking, to assure highest activity from the catalyst. Agitation of the reaction system is desirable in most instances.

While one of the surprisingly advantageous results of the present method is the fact that substantially no undesired polymerization of methyl methacrylate occurs, it is sometimes desirable to employ in the reaction system a small amount of a methyl methacrylate polymerization inhibitor, such as hydroquinone, in order to curb even slight polymerization tendencies when the most active catalysts or highest reaction temperatures are employed. Particularly when the preferred catalysts are employed, the tendency for the methyl methacrylate to polymerize is inappreciable even without an inhibitor present, even though methyl methacrylate readily polymerizes at the present temperatures and pressures.

At the conclusion of the present reaction, the catalyst is neutralized by the addition of acid, preferably of a mineral acid such as phosphoric, hydrochloric, sulfuric, and the like. The reaction mixture may then be filtered, if desired, and then distilled, preferably at reduced pressures. Unused reactants and water formed by the neutralization of the catalyst are removed first, by the distillation step. The product remains as the residue and it too may then be distilled to obtain maximum purity, if desired. The product is a colorless liquid that distils at 70° to 81° C. at 1.8 to 2.6 mm. absolute pressure.

The reactants used in this invention combine on a substantially equimolecular basis to produce methyl β-cyanoisobutyrate in yields consistently reaching 90% to 92% and above. The product is stable in the presence of the catalysts employed. The reactants of this invention are known and so is the product. Prior attempts to prepare the product of this invention by prior methods have produced only relatively insignificant amounts of product. The present invention represents an improvement in yield of product over prior attempts of from 18 to 40 fold.

The product of this invention, methyl β-cyanoisobutyrate, is a compound of known utility. It is useful as a solvent for polymers such as polyvinyl chloride, polyacrylates, and the like. It is a useful intermediate for making methylsuccinimide and 3-methyl-2-pyrrolidinone, by known methods, which may be converted by known methods, into N-vinyl methylsuccinimide and 3-vinyl-2-pyrrolidinone which are good monomers from which valuable structural polymeric products may be made by known procedures. These structural polymers may be advantageously used as building panels, signs, reinforcements, windows, and the like.

The present method may be more fully understood from the following examples which are offered by way of illustration and not by way of limitation. Parts by weight are used throughout.

EXAMPLE 1

There are added to a stainless steel autoclave, equipped with a heating jacket, a pressure gauge, a thermometer well and thermometer, a stirrer, a blow-out disc, a vent valve, and a copper pressure tubing feed line, 500 parts of methyl methacrylate, 32.5 parts of potassium cyanide, and 5 parts of hydroquinone. The autoclave is sealed, pressurized to 50 p. s. i. g. with nitrogen and heated to 170° C. with brisk stirring. The resultant pressure is 122 p. s. i. g.

There are mixed 500 parts of methyl methacrylate, 5 parts of hydroquinone, and 270 parts of anhydrous hydrocyanic acid. The mixture is then added to the autoclave at a rate of 5 parts per minute. During this addition, the temperature is maintained at 170° to 178° C. The pressure increases to 172 p. s. i. g. There is then introduced to the autoclave 25 parts of methyl methacrylate. The reaction mixture is stirred at 170 to 178° C. for one hour. The mixture is allowed to stand overnight at room temperature, after which the autoclave is vented and emptied. To the reaction there is added 38.5 parts of aqueous 85% phosphoric acid. The product is isolated by distillation at 70° to 81° C. at 1.8 to 2.6 mm. absolute pressure. The product contains 10.9% nitrogen (11.0% theoretical) and has an $n_D^{25}$ value of 1.4221. The product is identified as methyl β-cyanoisobutyrate in a yield of 92.3%.

The above method using a barium hydroxide catalyst and in the absence of hydroquinone yields the identical product in comparable yield.

The above method is repeated using a mixture of methyl β-cyanoisobutyrate and sodium carbonate in place of the original mixture of methyl methacrylate, potassium cyanide, and hydroquinone. One-half the hydrocyanic acid is used and the identical product results, in high yield.

The procedure of Example 1 is repeated employing various catalysts, temperatures, and pressures as shown in Table I.

*Table I*

| Catalyst | Temperature, °C. | Pressure, p. s. i. g. |
|---|---|---|
| Potassium Cyanide | 143–156 | 100–153 |
| Triethylamine | 150–158 | 112–227 |
| Trimethylamine | 155–163 | 112–250 |
| Triethylamine | 155–166 | 110–248 |
| Do | 160–167 | 114–255 |
| Do | 147–170 | 113–289 |
| Trimethylamine | 127–135 | 110–265 |
| Triethylamine | 150–160 | 108–245 |
| Octyldimethylamine | 152–162 | 102–260 |
| Triethanolamine | 149–156 | 98–325 |
| Potassium Cyanide | 159–163 | 103–155 |
| Sodium Cyanide | 149–159 | 97–192 |
| Potassium Cyanide | 162–177 | 109–207 |
| Magnesium Cyanide | 180–190 | 125–225 |
| Lithium Cyanide | 170–178 | 122–172 |

The runs listed above in Table I are conducted with and without hydroquinone inhibitor with comparable results. The product obtained is in each instance identified as methyl β-cyanoisobutyrate. Nitrogen values range from 10.8 to 11.1 (11.0% theoretical). Yields average from 89% to 93% based on methyl methacrylate converted.

EXAMPLE 2

There are added to a rocking autoclave 50 parts of methyl methacrylate, 14 parts of hydrocyanic acid, 0.5 part of hydroquinone, and 1 part of sodium methoxide. The mixture is heated at 200° C. for two hours, at autogenous pressure. The mixture is cooled, neutralized with phosphoric acid, filtered, and distilled. The product is isolated by distillation at 125° to 126° C. at 43 mm. absolute pressure. The product has an $n_D^{25}$ value of 1.4219 and is identified as methyl β-cyanoisobutyrate.

We claim:

1. A method for the preparation of methyl β-cyanoisobutyrate which comprises bringing together hydrocyanic acid and methyl methacrylate at a reacting temperature in the range of about 130° to 275° C. and at a reacting superatmospheric pressure in the range of about 50 to 2000 p. s. i. g. in the presence of a cyanide ion generating catalyst.

2. A method for the preparation of methyl β-cyanoisobutyrate which comprises bringing together hydrocyanic acid and methyl methacrylate at a reacting temperature in the range of about 140° to 180° C. and at a reacting superatmospheric pressure in the range of about 50 to 275 p. s. i. g. in the presence of 0.1 to 20% by weight of a cyanide ion generating catalyst.

3. A method for the preparation of methyl β-cyanoisobutyrate which comprises bringing together hydrocyanic acid and methyl methacrylate at a reacting temperature in the range of about 130° to 275° C. and at a reacting superatmospheric pressure in the range of about 50 to 2000 p. s. i. g. in the presence of an alkaline catalyst whose aqueous 0.1 molar solution has a pH of about at least 9.

4. A method for the preparation of methyl β-cyanoisobutyrate which comprises bringing together hydrocyanic acid and methyl methacrylate at a reacting temperature in the range of about 130° to 275° C. and at a reacting superatmospheric pressure in the range of about 50 to 2000 p. s. i. g. in the presence of an alkali metal cyanide catalyst.

5. A method for the preparation of methyl β-cyanoisobutyrate which comprises bringing together hydrocyanic acid and methyl methacrylate with methyl methacrylate and an alkaline catalyst whose aqueous 0.1 molar solution has a pH of about at least 9 at a temperature in the range of about 130° to 275° C. and at a superatmospheric pressure of about 50 to 2000 p. s. i. g.

6. A method for the preparation of methyl β-cyanoisobutyrate which comprises bringing together hydrocyanic acid and methyl methacrylate with methyl methacrylate and an alkaline catalyst whose aqueous 0.1 molar solution has a pH of about at least 9 at a temperature in the range of about 130° to 275° C. and at a superatmospheric pressure of about 50 to 2000 p. s. i. g. in which the total amount of said methyl methacrylate and hydrocyanic acid present are on a substantially equimolecular basis.

7. A method for the preparation of methyl β-cyanoisobutyrate which comprises introducing hydrocyanic acid to a mixture of methyl methacrylate and an alkaline catalyst whose aqueous 0.1 molar solution has a pH of about at least 9 at a rate so that reaction occurs substantially immediately after contact between said hydrocyanic acid and said methyl methacrylate, at a temperature of about 130° to 275° C. and at a superatmospheric pressure of about 50 to 2000 p. s. i. g.

8. A method for the preparation of methyl β-cyanoisobutyrate which comprises bringing together hydrocyanic acid and excess methyl methacrylate at a reacting temperature in the range of about 130° to 275° C. and at a reacting superatmospheric pressure in the range of about 50 to 2000 p. s. i. g. in the presence of an alkaline catalyst whose aqueous 0.1 molar solution has a pH of about at least 9.

9. A method for the preparation of methyl β-cyanoisobutyrate which comprises introducing hydrocyanic acid to a mixture of methyl methacrylate, methyl β-cyanoisobutyrate, and an alkaline catalyst whose aqueous 0.1 molar solution has a pH of about at least 9 at a rate so that reaction occurs substantially immediately after contact between said hydrocyanic acid and said methyl methacrylate, at a temperature of about 130° to 275° C. and at a superatmospheric pressure of about 50 to 2000 p. s. i. g.

10. A method for the preparation of methyl β-cyanoisobutyrate which comprises adding, at a rate to substantially maintain reaction conditions, hydrocyanic acid to a reaction vessel containing methyl methacrylate, a methyl methacrylate polymerization inhibitor, and 0.1 to 20% by weight of a cyanide ion generating catalyst at a reacting pressure in the range of about 50 to 2000 p. s. i. g. and a reacting temperature in the range of about 130° to 275° C.

References Cited in the file of this patent
FOREIGN PATENTS

| | | |
|---|---|---|
| 707,852 | Germany | July 5, 1941 |
| 808,835 | Germany | July 19, 1951 |

OTHER REFERENCES

Kurtz: Annalen der Chemie, vol. 572, page 53 (1951).